(12) United States Patent
Kaemmerer et al.

(10) Patent No.: US 12,451,621 B2
(45) Date of Patent: Oct. 21, 2025

(54) MULTISTAGE WELDING OF SPLICES BY MEANS OF AN ULTRASONIC WELDING DEVICE

(71) Applicant: Schunk Sonosystems GmbH, Wettenberg (DE)

(72) Inventors: Dennis Tobias Kaemmerer, Wettenberg (DE); Andreas Schary, Hohenahr (DE); Björn Kleespiess, Solms (DE)

(73) Assignee: Schunk Sonosystems GmbH

( * ) Notice: Subject to any disclaimer, the term of this patent is extended or adjusted under 35 U.S.C. 154(b) by 158 days.

(21) Appl. No.: 18/017,213

(22) PCT Filed: Jul. 30, 2020

(86) PCT No.: PCT/EP2020/071582
§ 371 (c)(1),
(2) Date: Jan. 20, 2023

(87) PCT Pub. No.: WO2022/022833
PCT Pub. Date: Feb. 3, 2022

(65) Prior Publication Data
US 2023/0275364 A1    Aug. 31, 2023

(51) Int. Cl.
*B23K 20/00* (2006.01)
*B23K 20/10* (2006.01)
(Continued)

(52) U.S. Cl.
CPC ............ *H01R 4/021* (2013.01); *B23K 20/004* (2013.01); *B23K 20/106* (2013.01); *H01R 43/0207* (2013.01); *B23K 2101/38* (2018.08)

(58) Field of Classification Search
CPC .. H01R 4/021; H01R 43/0207; B23K 20/004; B23K 2101/38; B23K 2101/32;
(Continued)

(56) References Cited

U.S. PATENT DOCUMENTS

| | | | | |
|---|---|---|---|---|
| 6,299,052 B1 * | 10/2001 | Wnek | ............. | B23K 20/10 |
| | | | | 228/110.1 |
| 2004/0178249 A1 * | 9/2004 | Gordon, Jr. | ............. | B23K 20/10 |
| | | | | 228/110.1 |

(Continued)

FOREIGN PATENT DOCUMENTS

| | | | | |
|---|---|---|---|---|
| CN | 101001712 B | * | 2/2013 | ............. B23K 20/10 |
| DE | 102004044480 A1 | * | 2/2006 | ............. B23K 20/10 |

(Continued)

OTHER PUBLICATIONS

Machine translation of JP-2007-185706A (no date available).*
(Continued)

*Primary Examiner* — Kiley S Stoner
(74) *Attorney, Agent, or Firm* — Arnall Golden Gregory LLP

(57) ABSTRACT

A method is described for welding a splice by way of an ultrasonic welding device, the ultrasonic welding device having a sonotrode for generating ultrasonic vibrations, an anvil, a first lateral element, a second lateral element and a compaction chamber, the height of which is adjustable by varying a distance between the sonotrode and the anvil and the width of which is adjustable by varying a distance between the first lateral element and the second lateral element.

14 Claims, 4 Drawing Sheets

(51) Int. Cl.
*H01R 4/02* (2006.01)
*H01R 43/02* (2006.01)
*B23K 101/38* (2006.01)

(58) Field of Classification Search
CPC .......... B23K 20/10–106; B23K 20/005; B23K 20/007; B29C 65/08
USPC ............... 228/1.1, 110.1, 4.5, 180.5, 904; 156/73.1–73.6, 580.1–580.2
See application file for complete search history.

(56) References Cited

U.S. PATENT DOCUMENTS

| | | | |
|---|---|---|---|
| 2013/0000949 | A1 | 1/2013 | Torimoto et al. |
| 2013/0293045 | A1 | 11/2013 | Kajita et al. |
| 2014/0374466 | A1 | 12/2014 | Coto |
| 2016/0136753 | A1 | 5/2016 | Ruhl et al. |
| 2019/0393664 | A1 | 12/2019 | Katou et al. |
| 2021/0399443 | A1 | 12/2021 | Kawata et al. |
| 2022/0368094 | A1 * | 11/2022 | Schmidt ............ B23K 37/0443 |

FOREIGN PATENT DOCUMENTS

| | | | | |
|---|---|---|---|---|
| DE | 112014002908 | T5 | 3/2016 | |
| DE | 102018200456 | A1 * | 7/2018 | ............ H01B 13/00 |
| DE | 102011014801 | B4 | 8/2019 | |
| JP | 2007185706 | A | 7/2007 | |
| JP | 2011-198506 | A | 10/2011 | |
| JP | 2012-124078 | A | 6/2012 | |
| JP | 2016-526488 | A | 9/2016 | |
| JP | 2020068141 | A | 4/2020 | |
| RS | 55944 | B1 * | 9/2017 | |
| WO | WO-2010026173 | A1 * | 3/2010 | ......... B23K 11/0026 |
| WO | WO-2011076515 | A1 * | 6/2011 | ............ B23K 20/10 |
| WO | WO2012060466 | A1 | 5/2012 | |
| WO | WO-2014204741 | A1 * | 12/2014 | ........... B23K 20/002 |
| WO | WO-2015007619 | A1 * | 1/2015 | ............ B23K 20/10 |
| WO | WO-2019076433 | A1 * | 4/2019 | .......... B23K 20/106 |
| WO | WO-2019091696 | A1 * | 5/2019 | ............ B23K 20/10 |

OTHER PUBLICATIONS

Chinese Patent Application No. 2023-506037, Notice of Reasons for Refusal and machine translation, dated Mar. 25, 2024.
Chinese Patent Application No. 2023-506037, Notice of Reasons for Refusal and machine translation, dated Sep. 25, 2024.
International Preliminary Report on Patentability translation issued in PCT/EP2020/071582, issued Jan. 31, 2023.

* cited by examiner

MULTISTAGE WELDING OF SPLICES BY MEANS OF AN ULTRASONIC WELDING DEVICE

FIELD OF THE INVENTION

The present invention relates to a method for welding a splice by means of an ultrasonic welding device. The invention further relates to a conductor bundle.

BACKGROUND OF THE INVENTION

For a wide variety of technical applications, it may be necessary to join two components together in a mechanically secure and/or electrically conductive manner. For example, it may be necessary for various purposes to join strands of cables together mechanically and in an electrically conductive manner. This makes it possible, for example, to produce wiring harnesses or cable looms which may be used to connect electrical consumers, inside a vehicle for example, to each other, to an energy source and/or to a control system in an electrically conductive manner.

So-called ultrasonic welding was developed to produce substance-to-substance bonds between electrically conductive components, providing them with high strength and good electrical conductivity. It is a special form of friction welding in which components to be welded are brought into surface contact with each other and moved against each other under low pressure and high-frequency mechanical vibrations. The vibrations may be generated with the aid of a sonotrode in which ultrasonic vibrations with frequencies of typically 20 kHz to 50 kHz are generated and transmitted to at least one of the joining partners. Plastic flow then allows the joining partners to permeate or interlock with each other close to the surface without the materials of the joining partners necessarily melting. Ultrasonic welding may therefore be used to bond joining partners together with low impact, quickly and economically. Welds in which a plurality of electrical conductors are joined to each other are also referred to as splices.

Welding of splices with relatively large cross-sections may be difficult in that ultrasonic energy introduced by the sonotrode is generally introduced into the overall volume of the splice only by a surface of the conductors to be welded, this surface being in contact with a surface of the sonotrode, the result being possibly inhomogeneous distribution of the ultrasonic energy and thus inhomogeneous welding together of the conductors.

For welding splices with relatively large cross-sections, a two-stage ultrasonic welding process may be used in which, for example, a smaller splice is welded first and in a further step this is welded with one or a plurality of further electrical conductors to form a larger splice with a desired overall cross-section. Corresponding processes are described, for example, in WO 2015/007619 A1 and DE 2011 014 801 B4.

DE 11 2014 002 908 T5, for example, describes an ultrasonic welding process in which a wire bundle is welded in a plurality of welding operations and the wire bundle is rotated with respect to the sonotrode between two welding operations.

SUMMARY OF THE INVENTION AND ADVANTAGEOUS EMBODIMENTS

There may be a need for a method of welding a splice by means of an ultrasonic welding device by which splices, in particular splices with relatively large cross-sections, may be produced with consistently high quality. There may also be a need for a conductor bundle in which a plurality of electrical conductors of high quality are welded together to form a splice.

Such a requirement may be met by the subject matter of the independent claims. Advantageous embodiments are defined in the dependent claims and the following description.

A first aspect of the invention relates to a method for welding a splice by means of an ultrasonic welding device. The ultrasonic welding device comprises a sonotrode for generating ultrasonic vibrations, an anvil, a first lateral element, a second lateral element and a compaction chamber, the height of which is adjustable by varying a distance between the sonotrode and the anvil and the width of which is adjustable by varying a distance between the first lateral element and the second lateral element. The method comprises the following steps which may preferably be performed in the order indicated: arranging first conductor portions of at least two electrical conductors to be welded in the compaction chamber; adjusting the width of the compaction chamber to a predetermined value for a first welding operation; performing the first welding operation by activating the sonotrode and compressing the first conductor portions between the sonotrode and the anvil, the first conductor portions being welded together to form a first splice; arranging a second conductor portion of at least one further electrical conductor to be welded and the first splice in the compaction chamber; adjusting the width of the compaction chamber to a predetermined value for a second welding operation, the width of the compaction chamber for the second welding operation being greater by a predetermined tolerance value than the width of the compaction chamber for the first welding operation; and performing the second welding operation by reactivating the sonotrode and compressing the first splice and the second conductor portion between the sonotrode and the anvil, the first splice and the second conductor portion being welded together to form a second splice.

The sonotrode and the anvil may be arranged in the ultrasonic welding device so as to be movable with respect to each other in at least one direction, for example to increase or decrease a vertical and/or horizontal distance between the sonotrode and the anvil. In this case, for example, the sonotrode may be fixed and the anvil movable. It is also possible, however, that the sonotrode is movable and the anvil fixed. Alternatively, both the sonotrode and the anvil may be movable.

A lateral element, for example, may be a sideshifter (=lateral slider) or a surface plate (=touching plate). The first lateral element and the second lateral element may be arranged in the ultrasonic welding device so as to be movable with respect to each other in at least one direction. For example, the first lateral element may be movable in the horizontal direction, while the second lateral element is fixed in the horizontal direction, and vice versa. Alternatively, both lateral elements may be movable in the horizontal direction. It is also possible that at least one of the two lateral elements is additionally movable in the vertical direction.

The compaction chamber may be limited by the sonotrode, the anvil, the first lateral element and the second lateral element on four different sides, at least during a welding operation. The compaction chamber may be open on one or a plurality of further sides. For example, the compaction chamber may be closed at the top by the anvil during a welding operation. By moving the anvil away, the compaction chamber may be opened at the top, for example before a welding operation in order to insert electrical conductors to be welded into the compaction chamber or after a welding operation in order to remove welded electrical conductors from the compaction chamber. For example, to make insertion or removal easier, in addition to moving the anvil away, at least one of the two lateral elements may be retracted so that the distance between the first lateral element and the second lateral element is correspondingly increased.

An electrical conductor may be a strand, i.e. a composite of a plurality of individual wires, or an individual wire of such a strand, i.e. a solid single conductor. The electrical conductor may be partially sheathed with an electrically insulating material. Accordingly, a conductor portion to be welded may be an unsheathed portion of the electrical conductor which may be located at one end of the electrical conductor or between two ends of the electrical conductor. The conductor portions to be welded may have cross-sectional areas of different size or the same size. The electrical conductor, for example, may be made of metal or another electrically conductive material. For example, the electrical conductor may also be a rigid part, such as a connection terminal, a busbar or the like.

A splice may generally be understood as a joint produced by welding together at least two joining partners. For example, in a first welding operation, a plurality of strands, i.e. a plurality of composite wires, may be welded together to form the first splice. However, it is also possible that in the first welding operation individual wires of one and the same strand are welded together to form the first splice, which is also referred to as compacting. In this case, the first splice may be understood as a compacted portion of this strand. In other words, a splice may comprise only one conductor (consisting of a plurality of individual wires) or several conductors.

As part of the process, first conductor portions of at least two electrical conductors to be welded are arranged in the compaction chamber. For this purpose, for example, the compaction chamber may be opened by moving away the anvil and/or at least one of the two lateral elements, for instance. At the same time, the width of the compaction chamber may be adjusted to the predetermined value for the first welding operation. In the closed state, the compaction chamber may be limited both in its height, by the sonotrode and the anvil, and in its width, by the two lateral elements.

The first splice and/or the second splice may have a rectangular-shaped, i.e. at least approximately rectangular cross-section. Rectangular-shaped here means that the cross-section is flattened on at least two opposing sides. For example, the cross-section may be flattened on all four sides. However, a barrel-shaped cross-section is also possible, for example. For example, the dimensions of the rectangular-shaped cross-section may correspond to the dimensions of the compaction chamber in the closed state after welding. By activating the sonotrode, the sonotrode is made to vibrate and welding energy is introduced into the conductor portions to be welded.

For example, the width of the compaction chamber may be adjusted to a nominal width of the first or second splice respectively. The nominal width may be a desired maximum width of the first or second splice respectively.

The width of the compaction chamber may be constant during the entire welding operation. It is also possible, however, that the width of the compaction chamber is altered during welding.

A further electrical conductor may be a further individual wire or a further strand, i.e. a welded or non-welded composite of further individual wires. It is also possible that the second conductor portion is a further splice in which a plurality of further electrical conductors are welded together. The further splice may have been produced, for example, by ultrasonic welding. For example, the second splice may be welded from the first splice, of at least one non-welded strand and/or at least one compacted strand.

The method comprises adjusting the width of the compaction chamber to a predetermined value for a second welding operation, the width of the compaction chamber for the second welding operation being greater by a predetermined tolerance value than the width of the compaction chamber for the first welding operation. The tolerance value may be selected so that the first splice has a slight clearance between the first lateral element and the second lateral element after adjusting the width of the compaction chamber. The clearance prevents the first splice from tilting or jamming in the compaction chamber. This may allow a defined distribution of forces to be achieved over the entire cross-section of the first splice in the subsequent welding operation. Thus a very homogeneous, i.e. very durable and very highly conductive, welded joint may be produced. The clearance may also reduce welding force losses by preventing direct contact of the first splice with the two lateral elements. The tolerance value should not be selected too large so that no material, such as individual wires, is pushed past the first splice during the subsequent welding operation and/or so that the resulting splice does not have any excessively large step(s).

The width of the compaction chamber for the second welding operation may be adjusted in the same way as for the first welding operation. For example, depending on the tolerance value selected, it is possible for the second splice to be divided in the direction of its height into two splice portions of different widths, each having a rectangular-shaped, i.e. at least approximately rectangular cross-section.

Tests have shown that in addition to reducing single-conductor breaks and discolorations, it was possible to increase process reliability due, among other things, to more uniform connector strengths. A more even distribution of the conductors over the width of the splice was also observed. It was also easy to reproduce the splice structure.

Without restricting the scope of the invention in any way, ideas and possible features relating to embodiments of the invention may be considered to be based, inter alia, on the thoughts and findings described below.

According to one embodiment, the second conductor portion is arranged between the first splice and the sonotrode. The first splice may initially be removed from the compaction chamber before the second conductor portion is arranged. For this purpose, the compaction chamber may be opened accordingly (see above). The second conductor portion may then be placed on the sonotrode. The first splice may then be placed on the second conductor portion so that direct contact between the first splice and the sonotrode is prevented. In the subsequent welding operation, the welding energy is thus introduced into the first splice indirectly via the second conductor portion. This may prevent renewed high thermal and mechanical stress on the first splice. Among other things, this may prevent or at least reduce breaks in individual wires or inhomogeneous regions in the weld metal.

According to one embodiment, the predetermined tolerance value is at least 0.01 mm. According to an alternative embodiment, the predetermined tolerance value is at least 0.05 mm. According to a further alternative embodiment, the predetermined tolerance value is at least 0.1 mm.

According to one embodiment, the predetermined tolerance value is at most 2 mm. According to an alternative embodiment, the predetermined tolerance value is at most 5 mm.

By using a tolerance value in the orders of magnitude specified, it is possible, on the one hand, to prevent tilting or jamming of the first splice in the compaction chamber. On the other hand, it is possible to prevent material from being pushed past the first splice during the second welding operation, which could have a quality-reducing effect on the welded joint, and/or prevent the second splice from having excessively large steps. This simplifies further processing of the conductor bundle, such as sheathing the second splice with a shrinkable tubing.

According to one embodiment, the second splice has a cross-sectional area of at least 3 mm$^2$. According to an alternative embodiment, the second splice has a cross-sectional area of at least 20 mm$^2$. According to a further alternative embodiment, the second splice has a cross-sectional area of at least 50 mm$^2$.

According to one embodiment, the second splice has a nominal width of at least 2 mm. According to an alternative embodiment, the second splice has a nominal width of at least 5 mm. According to a further alternative embodiment, the second splice has a nominal width of at least 10 mm.

As already indicated above, it was observed that it may be challenging to form splices of relatively large diameter and/or with relatively complex structure using ultrasonic welding since insufficiently homogeneous joints may occur between conductors and/or damage may occur to conductors, particularly close to the surfaces of the splice. Tests have shown that the method proposed here is particularly suitable for welding together electrical conductors with relatively large conductor cross-sections such as those used, for example, for high-current connections in electric or hybrid vehicles.

According to one embodiment, the width of the compaction chamber for the first welding operation is equal to a nominal width of the first splice.

According to one embodiment, the width of the compaction chamber for the second welding operation is equal to a nominal width of the second splice.

A nominal width of a splice may generally be understood as a desired maximum width of the splice. By adjusting the width of the compaction chamber to the nominal width of the first or second splice, it may be ensured by simple means that the first or second splice is not wider than this nominal width at its widest point.

According to one embodiment, the width of the compaction chamber for the first welding operation is equal to a difference between the nominal width of the second splice and the predetermined tolerance value. In other words, the nominal width of the first splice may be determined based on the nominal width of the second splice. The difference in width between the two splices may be selected just large enough to prevent tilting of the first splice when it is inserted onto the second conductor portion for welding the second splice.

Depending on the material hardness of the joining partners and the welding parameters, the joining partners may be flattened during a welding operation either over a partial region of the width of the compaction chamber or over the entire width of the compaction chamber. In the latter case, the first or second splice may be produced very easily and reproducibly with a desired final width by adjusting the width of the compaction chamber accordingly.

According to one embodiment, a cross-sectional area of the second conductor portion is at least as large as a respective smallest cross-sectional area of the first conductor portions. As a result, a relatively complex and/or relatively large splice may be constructed with just two welding operations.

According to one embodiment, the method further comprises arranging a third conductor portion of at least one additional electrical conductor to be welded and the second splice in the compaction chamber, adjusting the width of the compaction chamber to a predetermined value for a third welding operation, the width of the compaction chamber for the third welding operation being greater by a predetermined additional tolerance value than the width of the compaction chamber for the second welding operation, and performing the third welding operation by reactivating the sonotrode and compressing the second splice and the third conductor portion between the sonotrode and the anvil, the second splice and the third conductor portion of the at least one additional electrical conductor being welded together to form a third splice. In some cases, such as when splices with very large cross-sectional areas and/or very complex structure are to be produced, it may be necessary to weld in three or more than three steps to make the most efficient use of the welding power available.

For example, the third conductor portion may be arranged between the second splice and the sonotrode. This prevents direct contact between the second splice and the sonotrode. In the subsequent welding operation, the welding energy is thus introduced into the second splice indirectly via the third conductor portion. This prevents renewed high thermal and mechanical stress on the second splice. Among other things, this may prevent or at least reduce breaks in individual wires or inhomogeneous regions in the weld metal.

Similarly to the tolerance value mentioned above, the additional tolerance value may be selected so that the second splice has a slight clearance between the first lateral element and the second lateral element after adjusting the width of the compaction chamber. Thus tilting or jamming of the second splice in the compaction chamber may be prevented and a defined distribution of forces may be ensured over the entire cross-section of the second splice.

According to one embodiment, each of the electrical conductors is a partially sheathed strand, such as a partially stripped cable, and each of the conductor portions is an unsheathed portion of the strand. Thus, for example, suitable cable assemblies or harnesses for high-current applications may be produced very efficiently with durable, highly conductive joints.

A second aspect of the invention relates to a conductor bundle which comprises electrical conductors welded together in a splice. The splice is divided in the direction of its height into two splice portions, each having a rectangular-shaped, i.e. at least approximately rectangular cross-section. In this case, the two splice portions differ from each other in their average width by at least 0.01 mm or alternatively by at least 0.1 mm.

According to an alternative embodiment, the two splice portions may differ from each other in their average width by at least 0.05 mm.

The conductor bundle may preferably have been produced by a process according to an embodiment of the first aspect of the invention. However, the conductor bundle may also have been produced by another suitable welding process.

An average width may be understood as an average value for the relevant width of the splice portions determined on the basis of a plurality of measurements. For example, a plurality of width values may be measured for this purpose at several measuring points distributed over the relevant splice portion. Then, for example, these width values may be used to calculate an arithmetical average value and/or a median as the average width.

In other words, the splice portions may form a step or be separated from each other by a step in a region in which the splice portions are adjacent to each other in the direction of the height of the splice. Depending on the lateral offset of the two splice portions, the splice may have only one step or also two steps on opposing sides. Such a step may extend substantially transverse to the direction of the height of the splice, in particular in a direction orthogonal thereto. For example, the step may be visible to the naked eye. The step may be rounded, flattened or sharp-edged. For example, the step may be rounded with a rounding radius which is larger than a largest radius of an individual wire of the conductor bundle. In other words, the step may be wider than a maximum diameter of an individual wire of the conductor bundle. For example, the step may be at most 2 mm, preferably at most 5 mm, wide. The overall width of the step(s) may preferably be at least 0.05 mm, for example at least 0.1 mm. In particular, the overall width of the step(s) may correspond approximately to the tolerance value adjusted during production of the splice, as described above.

A conductor bundle produced by a process according to an embodiment of the first aspect of the invention may alternatively have no such step(s).

According to one embodiment, the splice is produced by ultrasonic welding. As a result, the conductor bundle may be produced without fusing conductor material and thus, by comparison with common fusion welding processes, with relatively low production costs.

According to one embodiment, each of the electrical conductors is a partially sheathed strand, non-sheathed portions of the strands being welded together to form the splice. In other words, each of the electrical conductors may be a partially stripped cable. The strands may each have a relatively large conductor cross-section of, for example, at least mm². As a result, the conductor bundle may be used for the protected transmission or distribution of currents, in particular relatively high currents of, for example, at least 100 A, such as in electric or hybrid vehicles.

It is noted that possible features and advantages of embodiments of the invention are described partly with reference to a method for welding a splice by means of an ultrasonic welding device, partly with reference to an ultrasonic welding device capable of carrying out such a method, partly with reference to a conductor bundle that may have been produced by such a method. A person skilled in the art will recognize that the features described for individual embodiments may be transferred to other embodiments in an analogous and suitable manner, may be adapted and/or interchanged to arrive at further embodiments of the invention and possibly synergistic effects.

BRIEF DESCRIPTION OF THE DRAWINGS

Advantageous embodiments of the invention are further explained below with reference to the accompanying drawings, wherein neither the drawings nor the explanations are to be construed as limiting the invention in any way.

The figures are merely schematic and not to scale. Identical reference numerals in the various drawings denote identical features or features having the same effect.

DESCRIPTION OF ADVANTAGEOUS EMBODIMENTS

Figure 1:
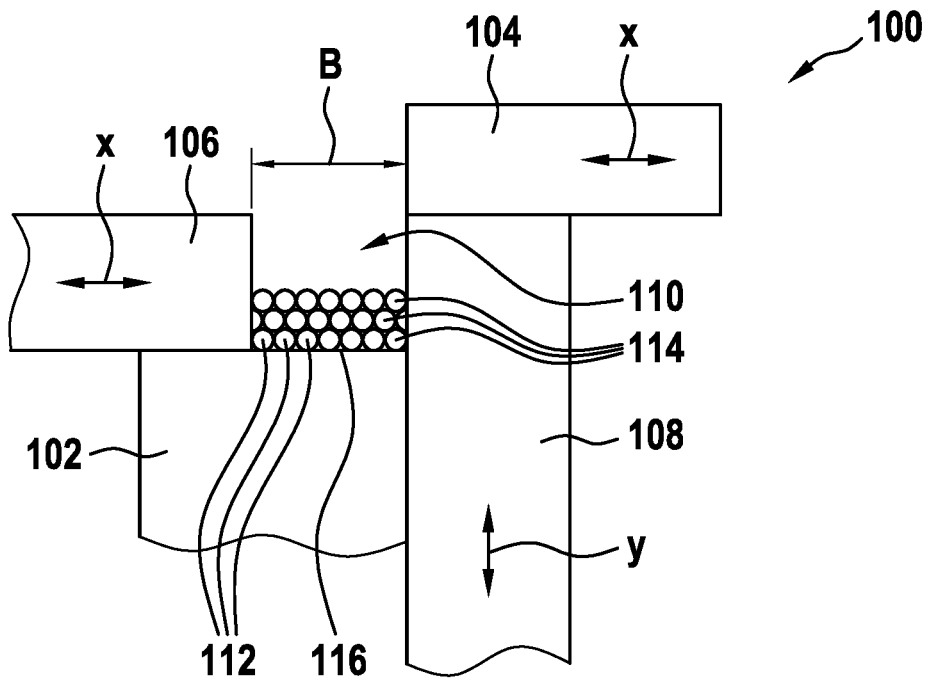
FIG. 1 shows a schematic illustration of an ultrasonic welding device according to an embodiment of the invention with opened compaction chamber before a first welding operation.

FIG. 1 shows a schematic illustration of an ultrasonic welding device 100 with a sonotrode 102 for generating ultrasonic vibrations, an anvil 104, a first lateral element 106, for example a sideshifter, and a second lateral element 108, for example a surface plate. The sonotrode 102, the anvil 104, the first lateral element 106 and the second lateral element 108 limit a compaction chamber 110, into which first conductor portions 112 of a plurality of electrical conductors 114 to be welded are inserted. Alternatively, only first conductor portions 112 of a single electrical conductor 114 may also be inserted, for compacting for example.

FIG. 1 shows the compaction chamber 110 by way of example in an opened state in which the compaction chamber 110 is open towards a side opposite the sonotrode 102 and is only limited on three sides by the sonotrode 102, the first lateral element 106 and the second lateral element 108. Thus the first conductor portions 112 may be inserted into the compaction chamber 110 from above, for example manually by an operator or automated by a gripping arm or the like. Contrary to the schematic illustration shown in FIG. 1, the lateral elements 106, 108 may also be adjusted such that there is some air between the first conductor portion 112 and the respective end faces of the two lateral elements 106, 108 during insertion. Alternatively, the sideshifter 106 may already be adjusted to a specific welding width before the electrical conductors 114 are inserted. In some cases, this makes insertion easier.

Figure 3:
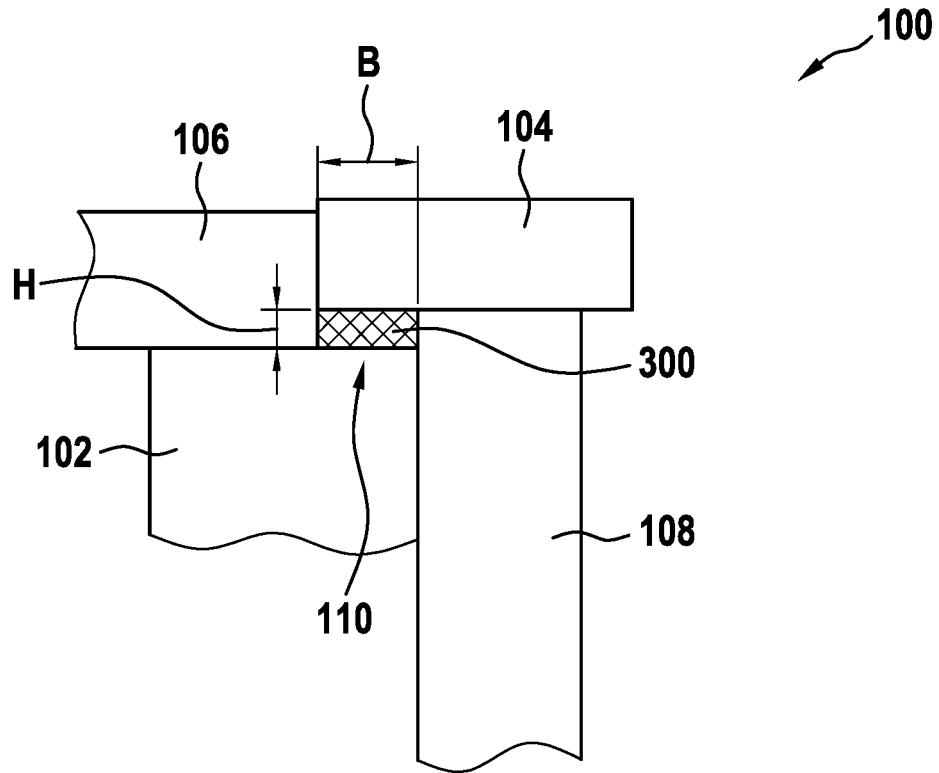
FIG. 3 shows the ultrasonic welding device of FIG. 1 with closed compaction chamber during the first welding operation.
Figure 5:
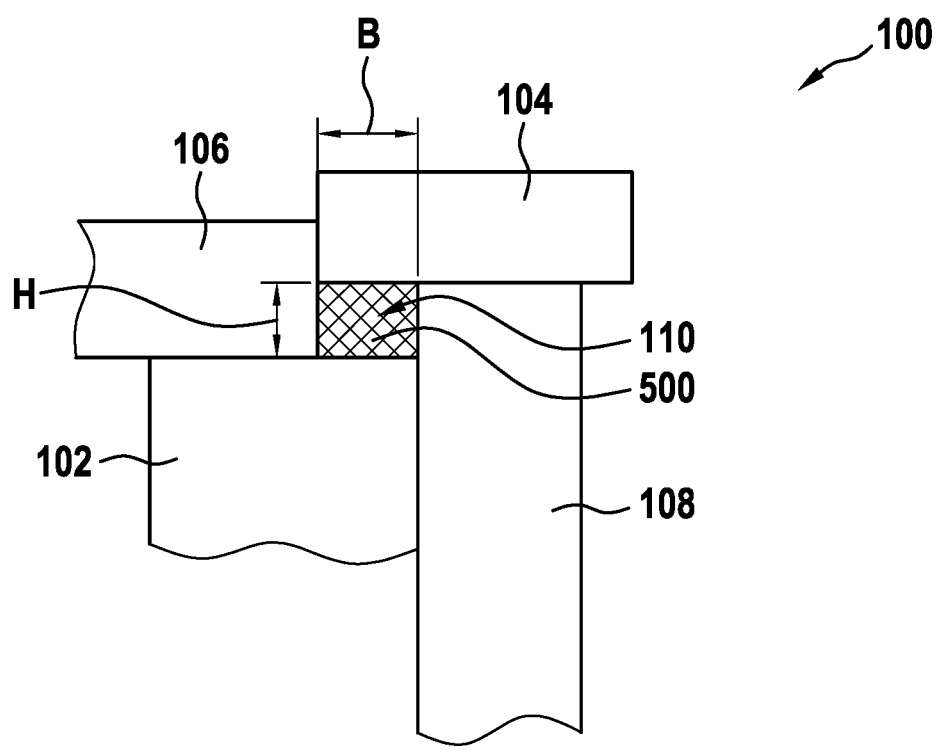
FIG. 5 shows the ultrasonic welding device of FIG. 1 with closed compaction chamber during the second welding operation.

For example, the compaction chamber 110 may be closed by the anvil 104 on the side opposing the sonotrode 102, as is shown in FIGS. 3 and 5.

A width B of the compaction chamber 110 is predetermined by a distance between the first lateral element 106 and the second lateral element 108 in the x-direction and may be varied in the x-direction by moving the first lateral element 106 and/or the second lateral element 108. In FIG. 1, by way of example, only the first lateral element 106 is movable in the x-direction, the second lateral element 108 being fixed in the x-direction.

A height H of the compaction chamber 110 is predetermined by a distance between the sonotrode 102 and the anvil 104 in the y-direction in the closed state of the compaction chamber 110 and may be varied by moving the sonotrode 102 and/or the anvil 104 in the y-direction. The height H is drawn in FIGS. 3 and 5. In FIG. 1, by way of example, only the anvil 104 is movable in the y-direction, the sonotrode 102 being fixed in the y-direction. For example, the second lateral element 108 may be movable in the y-direction, while the anvil 104 may be mechanically coupled to the second lateral element 108. Thus the anvil 104 may be moved in the y-direction together with the second lateral element 108.

The electrical conductors 114 may each be individual wires of one or a plurality of cables. For example, each of the electrical conductors 114 may be partially sheathed with an insulating material. Each of the electrical conductors 114 may thus be an individual cable. The first conductor portions 112 may be unsheathed portions of such a cable. Alternatively, a plurality of the electrical conductors 114 may be combined into one or a plurality of strands. For example, all electrical conductors 114 may also be combined into a single strand. Such a strand may in turn be partially sheathed by an insulating material, i.e. it may be a cable.

The first conductor portions 112 may be arranged in multiple layers on a sonotrode surface 116 of the sonotrode 102. The ultrasonic vibrations may be coupled into the first conductor portions 112 via the sonotrode surface 116, causing the first conductor portions 112 to be bonded together in a positive substance jointing, i.e. welded into a splice.

The ultrasonic welding device 100 is configured to weld together the first conductor portions 112 in two consecutive welding operations.

Figure 2:
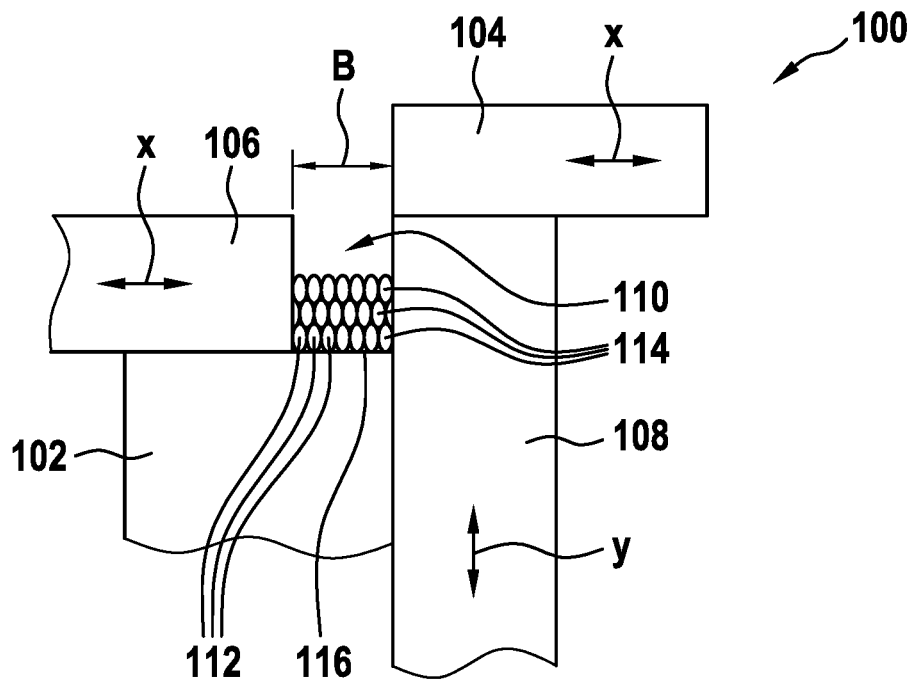
FIG. 2 shows the ultrasonic welding device of FIG. 1 with extended first lateral element.

For this purpose, the first lateral element 106 may be extended a short distance after insertion of the first conductor portions 112 to adjust the width B to a predetermined value for a first welding operation (see FIG. 2).

For example, the anvil 104 may additionally be lowered in the y-direction by lowering the second lateral element 108 and be moved in the x-direction towards the first lateral element 106. For example, the first lateral element 106 may act as a stop for the anvil 104 in the x-direction (see FIG. 3).

The sonotrode 102 is activated for welding and the first conductor portions 112 are compressed by means of the sonotrode 102 and the anvil 104. As a result, the first conductor portions 112 are welded together in a first splice 300 (see FIG. 3). In this case, the width of the first splice 300 may correspond to the width B of the compaction chamber 110. That is, the nominal width of the first splice 300 may be predetermined by the width B of the compaction chamber 110.

Figure 4:
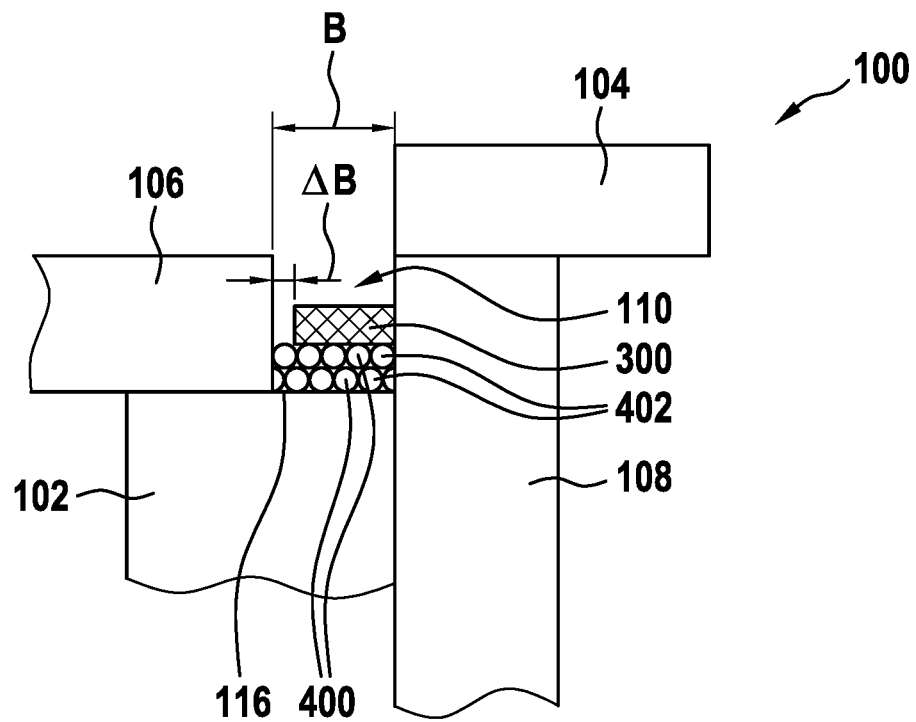
FIG. 4 shows the ultrasonic welding device of FIG. 1 with opened compaction chamber after the first welding operation and before a second welding operation.

After welding the first splice 300, the compaction chamber 110 may be reopened, for example by retracting the first lateral element 106 and/or the anvil 104. The first splice 300 may now be removed from the compaction chamber 110 and second conductor portions 400 of a plurality of further electrical conductors 402 may be placed on the sonotrode surface 116 (see FIG. 4). The second conductor portions 400 may be unsheathed portions of one or a plurality of further cables. The first splice 300 is inserted onto the second conductor portions 400 so that the sonotrode surface 116 makes contact with the second conductor portions 400 but not with the first splice 300.

Before, during or after insertion of the second conductor portions 400 and the first splice 300, the width B is adjusted to a predetermined value for a second welding operation. The predetermined value for the second welding operation is greater by a predetermined tolerance value ΔB than the predetermined value for the first welding operation. The tolerance value ΔB is selected so that the first splice 300 has a slight clearance between the first lateral element 106 and the second lateral element 108. The clearance prevents the first splice 300 from jamming or tilting between the first lateral element 106 and the second lateral element 108 (see FIG. 4).

Subsequently, the second conductor portions 400 and the first splice 300 are welded together in the second welding operation to form a homogeneous, second splice 500 which may be significantly larger than the first splice 300 (see FIG. 5). Here, the width of the second splice 500 may correspond to the width B of the compaction chamber 110. That is, the nominal width of the second splice 500 may be predetermined by the width B of the compaction chamber 110.

It is possible that, in a third welding operation similar to the first and second welding operation, the second splice 500 will be welded with a third conductor portion of at least one additional electrical conductor to form a third splice.

Figure 6:
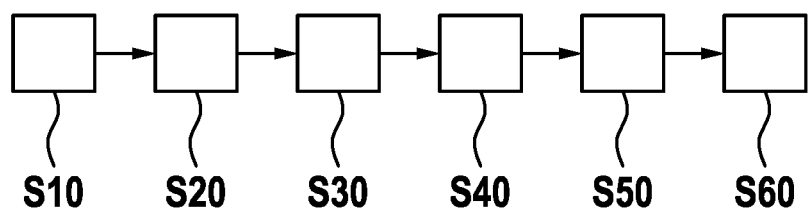
FIG. 6 shows a flow diagram of a method for welding a splice by means of an ultrasonic welding device according to an embodiment of the invention.

FIG. 6 illustrates the basic sequence of the ultrasonic welding method described with reference to FIGS. 1 to 5.

In step S10, first conductor portions 112 of at least two electrical conductors 114 to be welded are arranged in the compaction chamber 110.

In step S20, the width B of the compaction chamber 110 is adjusted to the predetermined value for the first welding operation.

In step S30, the first welding operation is performed by activating the sonotrode 102 and compressing the first conductor portions 112 between the sonotrode 102 and the anvil 104, the first conductor portions 112 being welded together to form the first splice 300.

In step S40, a second conductor portion 400 of at least one further electrical conductor 402 to be welded is arranged between the first splice 300 and the sonotrode 102 in the compaction chamber 110.

In step S50, the width B of the compaction chamber 110 is adjusted to the predetermined value for the second welding operation, the width B of the compaction chamber 110 for the second welding operation being greater by a predetermined tolerance value ΔB than the width B of the compaction chamber 110 for the first welding operation.

In step S60, the second welding operation is performed by reactivating the sonotrode 102 and compressing the first splice 300 and the second conductor portion 400 between the sonotrode 102 and the anvil 104, the first splice 300 and the second conductor portion 400 being welded together to form the second splice 500.

Figure 7:
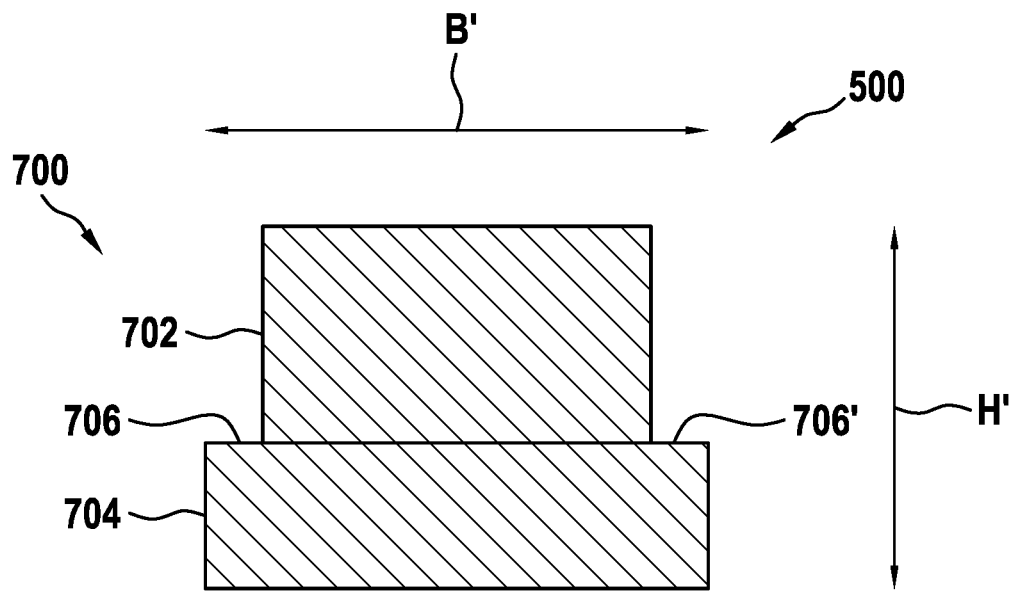
FIG. 7 show a schematic illustration of a conductor bundle according to an embodiment of the invention in cross-section.

The second splice 500 may have one or two steps on its lateral surfaces due to the different welding widths (see also FIG. 7).

Figure 8:
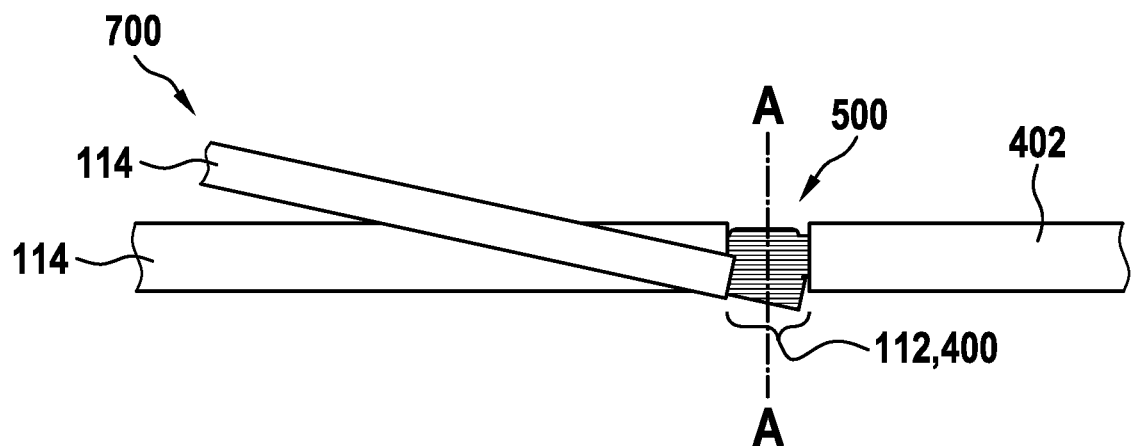
FIG. 8 shows a lateral view of the conductor bundle of FIG. 7.

FIG. 7 shows a cross-section through a conductor bundle 700 along a section line A-A shown in FIG. 8. The conductor bundle 700, for example, may have been produced by the method described above with reference to FIGS. 1 to 6 and comprise the conductors 114, 402 which are welded together in the second splice 500 (see also FIG. 8).

The second splice 500 is divided in the direction of its height H' into a first splice portion 702 and a second splice portion 704, each having an approximately rectangular cross-section. The splice portions 702, 704 differ from each other in the direction of their width B' by on average at least 0.01 mm, preferably by at least 0.1 mm.

The splice portions 702, 704 may be offset from each other in the direction of their width B' such that a step forms on one or both sides of the second splice 500. In FIG. 7, the second splice 500 has, by way of example, a left-hand step 706 and a right-hand step 706' which may have different widths depending on the offset of the splice portions 702, 704. For example, the sum of the respective widths of the steps 706, 706' may be at least 0.2 mm. The steps 706, 706' may therefore be seen with the naked eye.

It may further be seen from FIG. 8 that each of the electrical conductors 114, 402 is a partially sheathed strand and the strands are welded together in an unsheathed region, comprising the conductor portions 112, 400, to form the second splice 500.

The width B' of the widest splice portion 702, 704 may be equal to the nominal width of the second splice 500.

The height H' may be equal to the nominal height of the second splice 500.

Finally, it should be noted that terms such as "having", "comprising", etc. do not exclude any other elements or steps and the term "a" or "one" does not exclude a plurality. It should further be pointed out that features or steps which have been described with reference to one of the above exemplary embodiments may also be used in combination with other features or steps of other exemplary embodiments described above. Reference numerals in the claims are not to be regarded as a limitation.

LIST OF REFERENCE NUMERALS

100 Ultrasonic welding device
102 Sonotrode
104 Anvil
106 First lateral element
108 Second lateral element
110 Compaction chamber
112 First conductor portion
114 Electrical conductor
116 Sonotrode surface
300 First splice
400 Second conductor portion
402 Further electrical conductor
500 Second splice
700 Conductor bundle
702 First splice section
704 Second splice section
706 Left step
706' Right step
B Width of the compaction chamber
B' Width of the second splice
ΔB Tolerance value
H Height of the compaction chamber
H' Height of the second splice
x x-direction
y y-direction

The invention claimed is:

1. A method for welding a splice by way of an ultrasonic welding device, wherein the ultrasonic welding device has a sonotrode for generating ultrasonic vibrations, an anvil, a first lateral element, a second lateral element and a compaction chamber, the height of which is adjustable by varying a distance between the sonotrode and the anvil and the width of which is adjustable by varying a distance between the first lateral element and the second lateral element, wherein the method comprises:

arranging first conductor portions to be welded of at least two electrical conductors in the compaction chamber;

adjusting the width of the compaction chamber to a predetermined value for a first welding operation;

performing the first welding operation by activating the sonotrode and compressing the first conductor portions between the sonotrode and the anvil, wherein the first conductor portions are welded together to form a first splice;

arranging a second conductor portion to be welded of at least one further electrical conductor and the first splice in the compaction chamber, wherein the second conductor portion is arranged between the first splice and the sonotrode;

adjusting the width of the compaction chamber to a predetermined value for a second welding operation, wherein the width of the compaction chamber for the second welding operation is greater by a predetermined tolerance value than the width of the compaction chamber for the first welding operation, so that the first splice has a slight clearance between the first lateral element and the second lateral element after adjusting the width of the compaction chamber; and performing the second welding operation by reactivating the sonotrode and compressing the first splice and the second conductor portion between the sonotrode and the anvil, wherein the first splice and the second conductor portion are welded together to form a second splice.

2. The method according to claim 1,
wherein the predetermined tolerance value is at least 0.01 mm.

3. The method according to claim 1,
wherein the predetermined tolerance value is at most 5 mm.

4. The method according to claim 1,
wherein the second splice has a cross-sectional area of at least 3 mm$^2$.

5. The method according to claim 1,
wherein the second splice has a nominal width of at least 2 mm.

6. The method according to claim 1,
wherein the width of the compaction chamber for the first welding operation is equal to a nominal width of the first splice; and/or
wherein the width of the compaction chamber for the second welding operation is equal to a nominal width of the second splice.

7. The method according to claim 6,
wherein the width of the compaction chamber for the first welding operation is equal to a difference between the nominal width of the second splice and the predetermined tolerance value.

8. The method according to claim 1,
wherein a cross-sectional area of the second conductor portion is at least as large as a respective smallest cross-sectional area of the first conductor portions.

9. The method according to claim 1, further comprising:
arranging a third conductor portion of at least one additional electrical conductor to be welded and the second splice in the compaction chamber;
adjusting the width of the compaction chamber to a predetermined value for a third welding operation, wherein the width of the compaction chamber for the third welding operation is greater by a predetermined additional tolerance value than the width of the compaction chamber for the second welding operation; and
performing the third welding operation by reactivating the sonotrode and compressing the second splice and the third conductor portion between the sonotrode and the anvil, wherein the second splice and the third conductor portion are welded together to form a third splice.

10. The method according to claim 1, wherein each of the electrical conductors is a partially sheathed strand and each of the conductor portions is an unsheathed portion of the strand.

11. The method according to claim 1,
wherein the predetermined tolerance value is at least 0.1 mm.

12. The method according to claim 1,
wherein the predetermined tolerance value is at most 2 mm.

13. The method according to claim 1,
wherein the second splice has a cross-sectional area of at least 50 mm$^2$.

14. The method according to claim 1,
wherein the second splice has a nominal width of at least 10 mm.

* * * * *